United States Patent Office 3,398,124
Patented Aug. 20, 1968

3,398,124
PROCESS FOR THE PRODUCTION OF POLY-
ETHYLENE TEREPHTHALATE
Walter Rein, Obernburg, Erhard Siggel, Seckmauern, and Hans-Martin Koepp, Obernburg, Germany, assignors to Vereinigte Glanzstoff-Fabriken AG., Wuppertal-Elberfeld, Germany
No Drawing. Filed Feb. 7, 1966, Ser. No. 525,302
Claims priority, application Germany, Feb. 11, 1965, V 27,755
6 Claims. (Cl. 260—75)

ABSTRACT OF THE DISCLOSURE

Process of transesterifying dimethyl terephthalate with ethylene glycol and polycondensing the resulting diglycol terephthalate in which cobalt tungstate is used as the essential polycondensation catalyst.

---

This invention is concerned with the production of polyethylene terephthalate, and more particularly, the invention is directed to an improvement in the process of producing polyethylene terephthalate by using a novel polycondensation catalyst.

As is known, one proceeds in the production of polyethylene terephthalate so that in a first reaction stage, terephthalic acid dimethylester is transesterified at elevated temperatures with ethylene glycol and then the resulting terephthalic acid diglycol ester is polycondensed in a second reaction stage at further elevated temperatures and under reduced pressure. Both reactions are catalytically influenced and many different substances have already been suggested as agents for the acceleration of the transesterification or the polycondensation reactions.

The search for a suitable transesterification accelerator has already led to the discovery that very satisfactory catalysts in the form of zinc compounds, such as zinc acetate, are especially effective. The polycondensation catalysts which are presently known, however, still do not satisfy all requirements. At the present time, the use of antimony trioxide is most customary and is considered to give the best results. However, this substance has the disadvantage that it is not stable in the reaction mixture, but instead becomes converted into metallic antimony with a graying of the polymer composition. This visible discoloration of the polymer is obviously undesirable. In addition, the tendency of the antimony trioxide to decompose leads to a reduction of its catalytic activity, for which reason one is forced to introduce relatively large amounts of catalyst. However, since a removal of the catalyst substances or their decomposition products is difficult and expensive, extraction of the catalyst materials is usually omitted in conventional production processes, and the catalyst residues are still present in the polymer when formed into various shaped or molded products and considerably influence their quality and physical properties. Therefore, if less catalyst substance were required for the production of polyethylene terephthalate, then less catalyst residue would remain to influence the quality of the polymer.

One object of the present invention is to provide a polycondensation catalyst which is especially active so that very small additive amounts are possible.

Another object of the invention is to provide a novel polycondensation catalyst which aids in preventing the discoloration of the polyester product.

Still another object of the invention is to provide a novel polycondensation catalyst for the production of polyethylene terephthalate so as to enhance the thermal stability of the polyester product.

These and other objects and advantages of the present invention will become more apparent upon consideration of the following detailed specification.

It has now been found, in accordance with the invention that a polyethylene terephthalate product of superior quality can be produced while avoiding the above-noted disadvantages if in the conventional production of polyethylene terephthalate by transesterification of dimethyl terephthalate with ethylene glycol followed by polycondensation, cobalt tungstate is employed as the polycondensation catalyst in an amount of about 0.0005 to 0.1% by weight, preferably about 0.001 to 0.01% by weight, with reference to the amount of the dimethyl terephthalate reactant.

In carrying out the process of the invention, conventional steps are employed in both the transesterification stage and the immediately following polycondensation stage except that cobalt tungstate is used as the essential polycondensation catalyst, preferably in place of rather than in combination with other known polycondensation catalysts. Thus, the transesterification reaction is generally carried out at about 160° C. to 220° C., preferably with zinc acetate as the catalyst although it is also feasible to use other transesterification catalysts in this stage. The polycondensation reaction is then carried out under a vacuum, e.g., down to pressures below 1 mm. Hg, at temperatures of about 270° C. to 290° C. for a period of time sufficient to reach a high molecular weight polymer as determined by the desired solution viscosity. The process of the invention can be used with advantage in order to obtain the polyester with a solution viscosity ranging from about 1.35 to 2.0, preferably in a range of 1.40 to 1.85.

Surprisingly, it has been found that the polycondensation reaction in the presence of the catalyst according to the invention proceeds much more rapidly than with antimony trioxide and, at the same time, the necessary amount of catalyst is less than half of the amount required with antimony trioxide. A further advantage of the process according to the invention resides in the fact that the blue coloration imparted by the cobalt tungstate catalyst works in opposition to the yellowing of the polymer which always occurs to a ceratin extent in the polycondensation of polyethylene terephthalate. A very satisfactory effect is thus obtained, especially in the use of the polyester for the production of textile filaments. In this case, no attempt is made to extract the catalyst of the invention. Decomposition phenomena, which are observed when using antimony trioxide during the polycondensation, do not occur with the use of cobalt tungstate. Furthermore, it is possible to carry out the polyester production without a different catalyst for the transesterification, since cobalt tungstate also exhibits catalytic activity in this stage of the reaction.

The catalyst according to the invention is especially useful in the production of polyethylene terephthalate with a relative viscosity of above 1.7, which is preferably used in the production of textile filaments and tire cords. In the presence of the catalyst according to the invention, the polycondensation can be carried out without difficulties until the polymer material exhibits a melt viscosity of over 20,000 poise, and this result is possible with previously known catalysts only with great difficulties. Another surprising advantage is the increased heat stability of the polyethylene terephthalate which has been produced according to the process of the invention. In comparison with polyethylene terephthalate obtained with antimony trioxide as the polycondensation catalyst, there is a considerable increase in thermal stability when using cobalt tungstate as the essential catalyst.

As has already been emphasized, zinc acetate is especially suitable for use as the transesterification catalyst. However, a noteworthy disadvantage of this compound is that it very unfavorably influences the thermal stability of the polyester, whereby the quality and possibilities for use of the polyethylene terephthalate are reduced. In the use of cobalt tungstate as polycondensation catalyst, however, the zinc catalyst is evidently effectively inactivated, because the polyethylene terephthalate produced with zinc acetate as the transesterification catalyst and cobalt tungstate as polycondensation catalyst shows a substantially increased thermal stability by comparison with a polyester produced with the use of zinc acetate in combination with antimony trioxide as polycondensation catalyst.

Values set forth herein for the solution viscosity, often also designated as relative viscosity, of the polyethylene terephthalate have been measured as 1% solutions of the polymer in m-cresol at 25° C. The melt viscosity values for polyethylene terephthalate mentioned herein have been ascertained by determination of the flow rate of the molten polycondensate at 280° C. through a glass tube of 2 mm. diameter.

The catalyst used according to the invention can be introduced as a water-free or water-containing substance. It can be initially obtained, for example, as a blue precipitate if one brings together an aqueous cobalt acetate solution and a solution of sodium tungstate. According to the invention, one adds the catalyst in amounts of 0.0005 to 0.1% by weight, preferably 0.001 to 0.01% by weight, with reference to the initial dimethyl terephthalate reactant, either before or at the beginning of the polycondensation reaction. In order to avoid any undesirable counteraction between the polycondensation catalyst according to the invention and different transesterification catalysts, the catalyst of the invention preferably should not be added together with such transesterification catalysts to the reaction mixture. Thus, in general, it has proven considerably more favorable to add the transesterification catalyst and the polycondensation catalyst separately, one after the other, i.e., to their respective stages in the overall process.

The following examples provide a more detailed illustration of the process according to the invention. Parts and percentages by weight are given with reference to the dimethyl terephthalate reactant unless otherwise indicated.

EXAMPLE 1

100 grams of dimethyl terephthalate were transesterified in a glass flask with the addition of 100 grams ethylene glycol and 0.01% by weight of zinc acetate. The flask was provided with a stirrer and a packed column. The transesterification took place with distillation off of methyl alcohol at reaction temperatures between 165° C. and 210° C. within a time interval of about 90 minutes. Before the beginning of the polycondensation, about 0.01% by weight of cobalt tungstate was added and mixed into the reaction mass. The reaction mass was transferred into a laboratory glass autoclave, which had been equipped with a stirrer and connected with an oven heater. At a heating temperature of 280–285° C., glycol being set free was distilled off over the next 30 minutes. Thereafter, the autoclave was evacuated and a vacuum of about 1 mm. Hg was attained after 20 minutes. After another 10 minutes, a vacuum corresponding to a pressure of about 0.15 mm. Hg was reached. The polycondensation was then completed 76 minutes after the beginning of the evacuation program. The resulting polyester had a solution viscosity of 1.58 and was completely colorless in an evaluation of a 5 cm. thick molten film by observation therethrough. It could be formed into filaments which likewise were fully colorless and which also exhibited the usual good textile properties of polyethylene terephthalate filaments.

EXAMPLE 2

100 grams of dimethyl terephthalate were transesterified in a glass flask with 100 grams ethylene glycol under the addition of 0.015% by weight of zinc acetate as described in Example 1.

To the resulting terephathalic acid diglycol ester there was added 0.0125% by weight of cobalt tungstate. After being transferred into a glass autoclave, the temperature was raised to 280° C. and a vacuum was then applied after removal of the glycol. After 30 minutes, a vacuum of 0.2 mm. Hg. was exhibited. 110 minutes after the beginning of the evacuation program, the polycondensation ended. The resulting polyethylene terephthalate had a melt viscosity of 26,000 poise.

EXAMPLE 3

500 kilograms of dimethyl terephthalate were transesterified with 500 kilograms of ethylene glycol in the presence of 150 parts per million of zinc acetate as the transesterification catalyst. The transesterification was carried out in a stainless-steel vessel which had been equipped with a stirrer and a packed column, within a reaction period of 150 minutes at an initial temperature of 150° C. up to a final temperature of 215° C.

75 parts per million of cobalt tungstate were added to the resulting transesterification product, and the temperature was raised to 240° C. for removal of the excess glycol. After transferring the reaction mixture into a stainless steel-stirring autoclave, a vacuum was applied until an absolute pressure of 0.2 mm. Hg was attained. After a total polycondensation period of 175 minutes, during which the temperature was increased up to 290° C., a polyethylene terephthalate having a relative viscosity of 1.75 was drawn off as a band and granulated. The granulated product was then formed into filaments according to the melt spinning process, the resulting filaments exhibiting an elongation (at the breaking point) of 13–14% and a titer of about 1000 denier.

These filaments were exposed to a temperature of 205° C. over a total period of 16 hours, and after 3, 6, 9 and 16 hours, samples of the filaments were tested to determine the elongation and strength still retained as a percentage of the original values prior to such exposure. In the same manner, this heating test was simultaneously applied to polyethylene terephthalate filaments of the same titer which had been produced from the same dimethyl terephthalate, but in the presence of 0.020% by weight of manganese acetate and 0.025% by weight of antimony trioxide as catalysts, the polycondensation time necessarily being substantially longer in order to achieve about the same solution viscosity in the final product. The results of these comparative heating tests are shown in the following table:

|  | Heating Test at 205° C. (percent) | | | |
| --- | --- | --- | --- | --- |
|  | 3 hours | 6 hours | 9 hours | 16 hours |
| Catalyst—$CoWO_4$: | | | | |
| Residual strength | 83 | 75 | 69 | 60 |
| Residual elongation | 91 | 92 | 90 | 84 |
| Catalyst—$Sb_2O_3$: | | | | |
| Residual strength | 74 | 65 | 61 | 40 |
| Residual elongation | 83 | 80 | 76 | 58 |

The table clearly shows the superiority of the process according to the invention (the residual strength and elongation being expressed in each case as the percentage of strength and elongation data obtained with original samples prior to the heating test).

The invention is hereby claimed as follows:

1. In a process for the production of polyethylene terephthalate by transesterification of dimethyl terephthalate with ethylene glycol and polycondensation of the resulting diglycol terephthalate, the improvement which comprises carrying out said polycondensation in the presence of cobalt tungstate in an amount of about 0.0005 to 0.1 by weight, with reference to the dimethyl terephthalate reactant.

2. The process as claimed in claim 1 wherein the amount of said cobalt tungstate is about 0.001 to 0.01% by weight, with reference to the dimethyl terephthalate reactant.

3. The process as claimed in claim 1 wherein said transesterification is carried out in the presence of a catalytic amount of zinc acetate.

4. The process as claimed in claim 1 wherein said cobalt tungstate is added to the reaction mixture at a time just before up through the beginning of said polycondensation.

5. The process as claimed in claim 1 wherein zinc acetate is added in a catalytic amount to said transesterification and said cobalt tungstate is added subsequently to said polycondensation.

6. The process as claimed in claim 1 wherein said polycondensation is carried out in the presence of cobalt tungstate as the essential polycondensation catalyst at about 270° C. to 290° C. for a period of time sufficient to obtain a polyethylene terephthalate having a solution viscosity of about 1.35 to 2.0, measured as a one percent solution of the polymer in m-cresol at 25° C.

References Cited
UNITED STATES PATENTS

| | | | |
|---|---|---|---|
| 2,465,319 | 3/1949 | Whinfield et al. | 260—75 |
| 2,998,412 | 8/1961 | Fletcher | 260—75 |
| 3,142,733 | 7/1964 | Keck | 260—75 |

WILLIAM H. SHORT, *Primary Examiner.*
LOUISE P. QUAST, *Assistant Examiner.*